(12) United States Patent
Brown

(10) Patent No.: US 11,402,251 B2
(45) Date of Patent: Aug. 2, 2022

(54) FUEL TANK ASSEMBLY

(71) Applicant: Christopher J. Brown, Oregon City, OR (US)

(72) Inventor: Christopher J. Brown, Oregon City, OR (US)

(*) Notice: Subject to any disclaimer, the term of this patent is extended or adjusted under 35 U.S.C. 154(b) by 581 days.

(21) Appl. No.: 16/361,998

(22) Filed: Mar. 22, 2019

(65) Prior Publication Data

US 2020/0300687 A1 Sep. 24, 2020

(51) Int. Cl.
*G01F 23/38* (2006.01)
*B60K 15/03* (2006.01)

(52) U.S. Cl.
CPC .............. *G01F 23/38* (2013.01); *B60K 15/03* (2013.01); *B60K 2015/03217* (2013.01)

(58) Field of Classification Search
CPC .......... G01F 23/38; G01F 23/72; G01F 23/74; G01F 23/76; B60K 15/03; B60K 2015/03217
See application file for complete search history.

(56) References Cited

U.S. PATENT DOCUMENTS

| | | | | |
|---|---|---|---|---|
| 5,750,021 A | * | 5/1998 | Liang | B01D 29/07 210/86 |
| 2012/0210782 A1 | * | 8/2012 | Downs | G01F 23/38 73/317 |
| 2015/0355014 A1 | * | 12/2015 | Deak | G01F 23/62 73/313 |
| 2017/0102261 A1 | * | 4/2017 | Payne | G01D 5/145 |

* cited by examiner

*Primary Examiner* — Suman K Nath
(74) *Attorney, Agent, or Firm* — Ingrid McTaggart

(57) ABSTRACT

One embodiment of a fuel tank assembly includes a fuel sending unit having a float with a small thickness, which heretofore has been too thin to secure a stand-alone magnet thereon. The float may be manufactured in a complex shape or in a small size. In one embodiment the float may be manufactured of a material having magnetized particles interspersed throughout the float such that the float does not require a stand alone magnet secured thereon. The float may be manufactured of a material having a foaming agent added thereto so as to provide a finished product with air filled voids positioned throughout the float to increase the buoyancy of the finished float product.

20 Claims, 4 Drawing Sheets

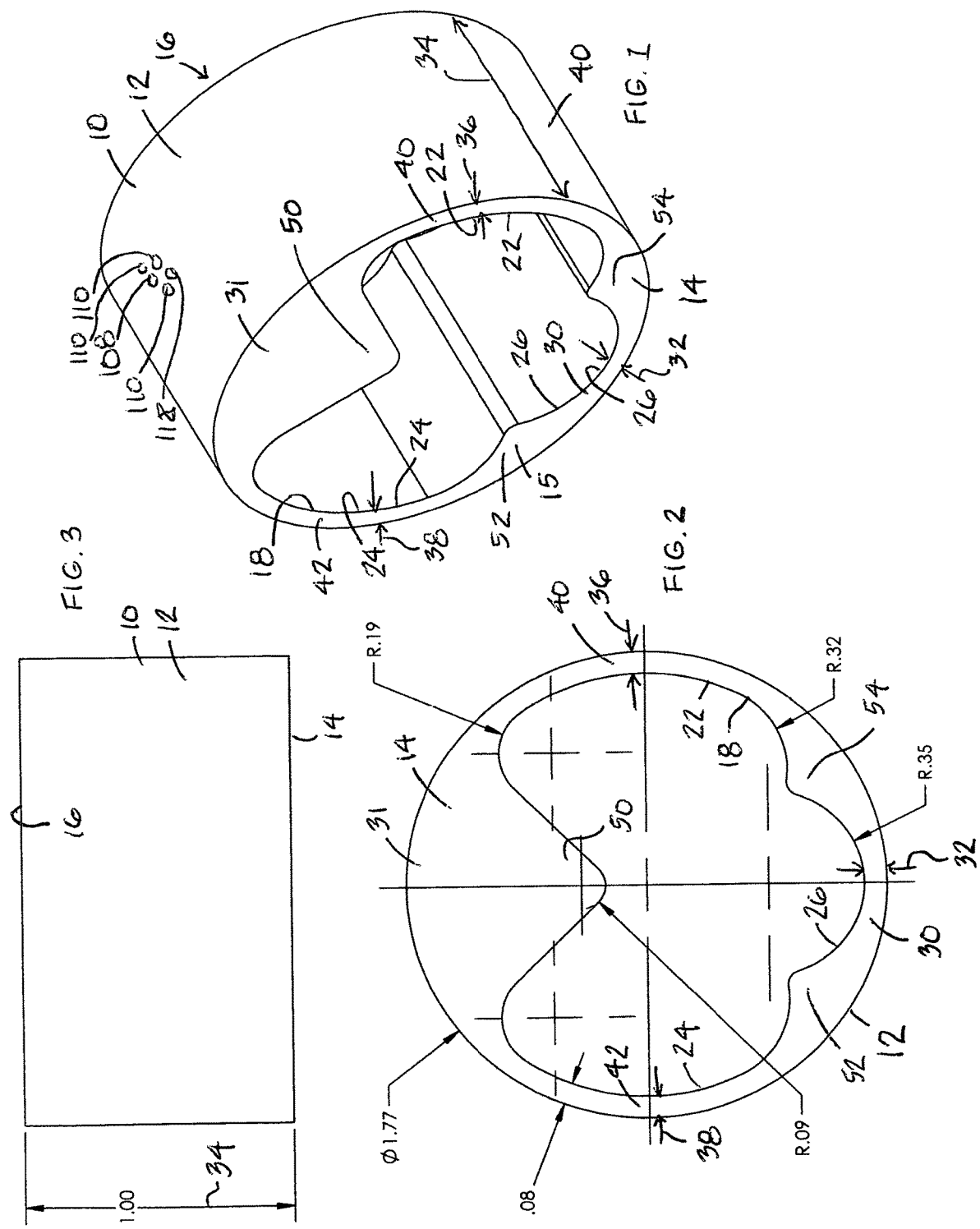

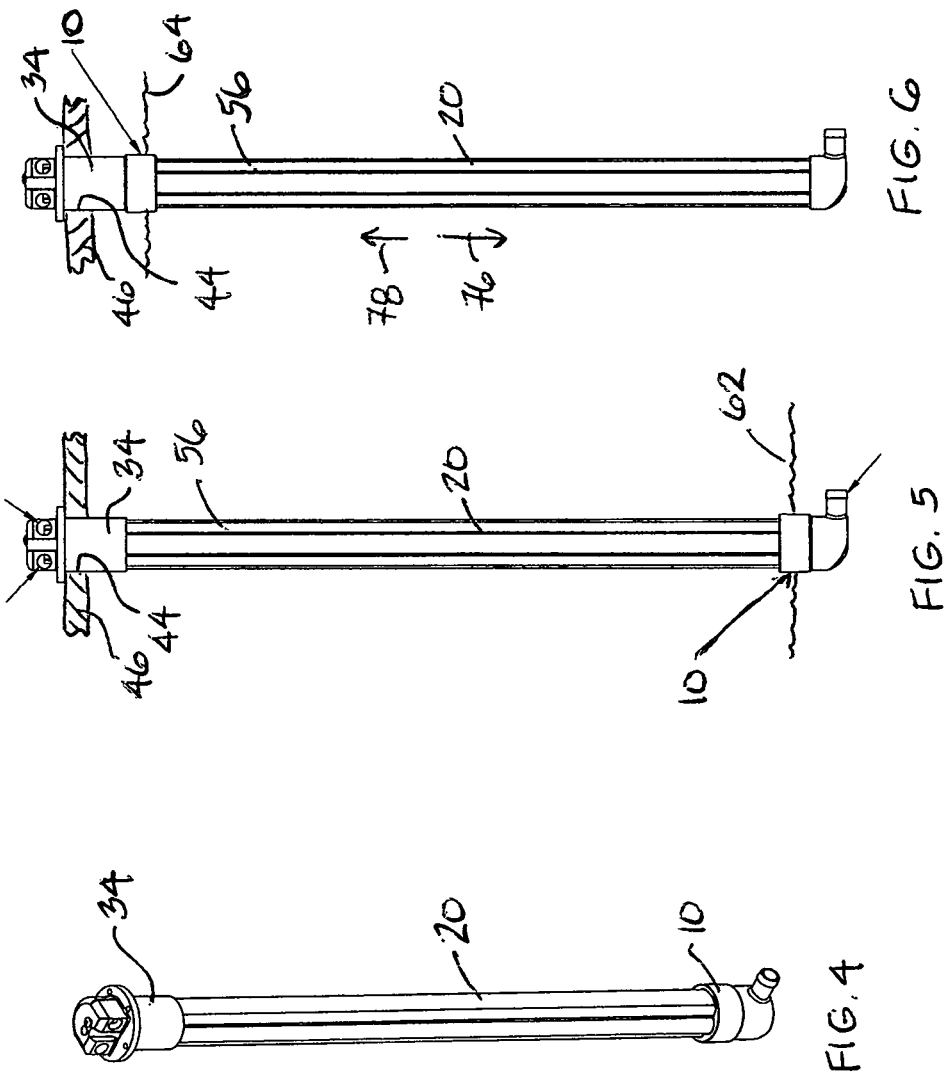

FUEL TANK ASSEMBLY

BACKGROUND OF THE INVENTION

A fuel tank assembly may include a fuel-sending unit that may include a potentiometer that is adjusted by a float attached to a pivoting rod. When the fuel in the tank drops in level, the arm with the attached float correspondingly drops, which changes the amount of resistance in the potentiometer. In another embodiment the float may be in the shape of a donut that moves upwardly and downwardly along a cylindrical rod. The donut shaped float may include a magnet positioned on an exterior surface of the float so that as the float moves along the cylindrical rod, sensors within the rod may be activated by the magnet to sense a fuel level within a fuel tank.

In an embodiment in which a donut type float is utilized, the float is manufactured with a thickness sufficient to secure a stand alone magnet thereon. Moreover, the float is manufactured in an overall size that allows the float to be buoyant, even with a heavy stand alone magnet secured thereon. This required thickness and size of the float constrains the design of a fuel tank system. In particular, in some embodiments, a float having a smaller thickness, a smaller overall size, and/or a complex shape, may be desired but may not be feasible to manufacture based on these prior art manufacturing constrains.

SUMMARY OF THE INVENTION

One embodiment of a fuel tank assembly includes a fuel sending unit having a float with a small thickness, which heretofore has been too thin to secure a stand-alone magnet thereon. The float may be manufactured in a complex shape or in a small size. In one embodiment the float may be manufactured of a material having magnetized particles interspersed throughout the float such that the float does not require a stand alone magnet secured thereon. The float may be manufactured of a material having a foaming agent added thereto so as to provide a finished product with air filled voids positioned throughout the float to increase the buoyancy of the finished float product.

BRIEF DESCRIPTION OF THE DRAWINGS

FIG. 1 is an isometric view of one example embodiment of a float of the present invention.

FIG. 2 is a front view of the float of FIG. 1.

FIG. 3 is a plan view of the float of FIG. 1.

FIG. 4 is an isometric view of one example embodiment of a fuel sending unit of the present invention, with a float in a lowered position.

FIG. 5 is a side view of the fuel sending unit of FIG. 4 with the float in a lowered position.

FIG. 6 is a side view of the fuel sending unit of FIG. 4 with the float in a raised position.

DETAILED DESCRIPTION OF THE PREFERRED EMBODIMENTS

Figure 7:
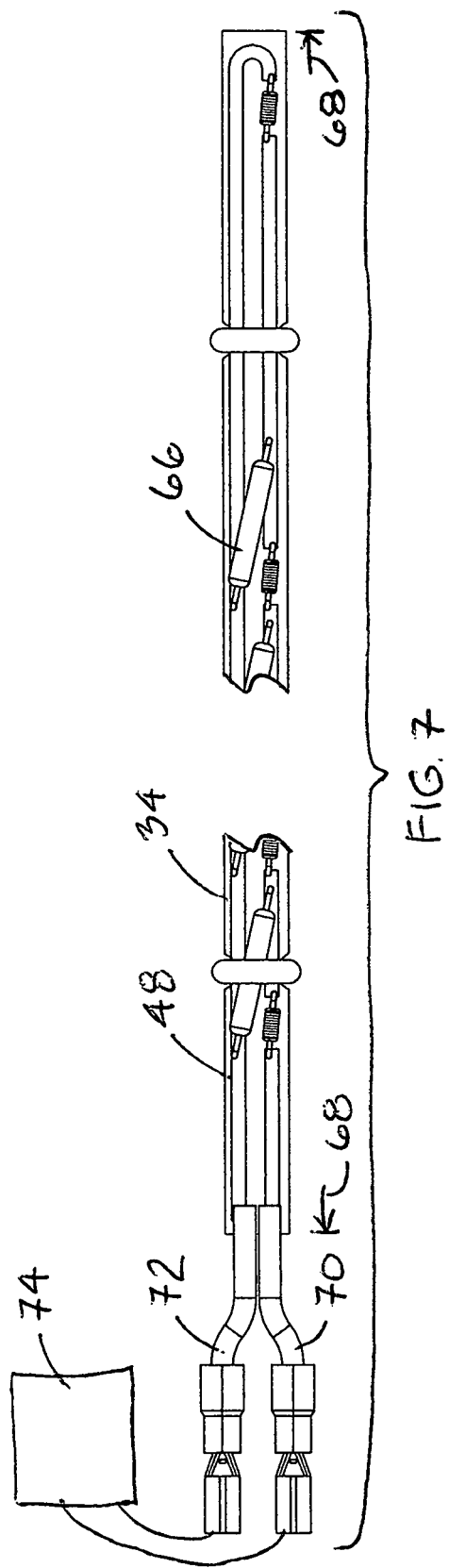
FIG. 7 is a plan view of one example embodiment of a printed circuit board of a fuel sending unit.

A fuel tank assembly may include a level sending unit, or a fuel gauge, that sends a signal to a vehicle operator indicating to the operator a fuel level in a fuel tank. Most present-day vehicles use a printed circuit board with reed switches included therein, and a float that moves along the printed circuit board, wherein a stand-alone magnet attached to the float activates the reed switches to indicate a level of fuel within the fuel tank. In one embodiment the prior art float may be in the shape of a donut that moves upwardly and downwardly along a cylindrical rod having the printed circuit board positioned therein. In prior art devices, the donut shaped float may include a stand-alone magnet positioned on an exterior surface of the float so that as the float moves along the cylindrical rod, the reed switch sensors of the printed circuit board positioned within the rod may be activated by the stand-alone magnet to sense a fuel level within a fuel tank.

As stated above, in a prior art embodiment in which a donut type float with a stand-alone attached magnet is utilized, the float must be manufactured with a thickness sufficient to secure the magnet thereon. Prior art floats must also be manufactured in an overall size that allows the float to be buoyant, even with a heavy stand alone magnet secured thereon. Accordingly, floats of the prior art required a thickness and size of the float that constrained the design of the fuel tank system.

Applicant desires to provide a fuel tank assembly including a fuel level sender assembly that may include a float having a smaller thickness, a smaller overall size, and/or a complex shape, while still having a magnetic property so as to activate reed switches on a printed circuit board positioned within a level sender receiving aperture of a level sending unit of a fuel tank. In one preferred embodiment, Applicant's assembly includes a float manufactured with magnetized material interspersed throughout the float. The float may also include a foaming agent added during the manufacturing stage which results in a finished float product having air voids interspersed throughout the float, thereby providing a float with increased buoyancy compared to floats of the prior art. Due to the use of interspersed magnetized particles throughout the float, together with air pockets or voids interspersed throughout the float, the float of the present invention can be manufactured with a thin wall thickness, a small overall size, and may be manufactured in a variety of unique and customized shapes heretofore not possible due to the constraints of the prior art.

The figures of the invention will now be described in detail.

FIG. 1 is an isometric view of one example embodiment of a float 10 of the present invention. Float 10, in the embodiment shown, is in the shape of a collar having a generally cylindrical shape with a cylindrical side wall 12, having a generally circular upper surface 14 and a generally circular lower surface 16. Float 10 further includes an aperture 18 extending through float 10 from upper surface 14 to lower surface 16. In the embodiment shown aperture 18 has a unique shape designed to fit snuggly around a rod 20 (see FIG. 9) having a unique exterior shape. In this embodiment aperture 18 defines a "butterfly" type shape with first and second side lobes 22 and 24 having a generally "D" shape, and a central lobe 26 that defines a generally semi-circular shape.

Central lobe 26 of aperture 18 of float 10 extends downwardly, in this view, toward cylindrical sidewall 12 in a region 30 such that region 30 of float 10 has a thickness 32. In one example embodiment, float 10 has a length 34 of 1.0 inch, and a thickness 32 of 0.160 inches in region 30. Similarly, lobes 22 and 24 extend outwardly toward cylindrical sidewall 12 such that float 10 has a thickness 36 and 38 in corresponding regions 40 and 42, that is thin compared to the thicknesses of prior art floats. In one example embodiment, regions 40 and 42 may include thickness 36 of 0.160 inches and a thickness 38 of 0.160 inches. Such a thickness 32, or 36, or 38, may be too thin to support a stand-alone magnet of the prior art in any of regions 30, 36 or 38. In particular, region 30 of float 10 may be too thin to support a stand alone-magnet, yet in this embodiment region 30 is positioned adjacent a printed circuit board of a fuel sending unit (see FIG. 9) so that it is desirable to have magneteic properties within float 10 at region 30. Moreover, even if a stand-alone magnet were positioned in region 30 of float 10, in such a case, the magnet may render region 30 heavier than an opposite region 31 of float 10, such that float 10 may not have an even buoyancy, may tip toward region 30, and therefore may not easily move upwardly and downwardly along a rod 20 (FIG. 5). The float 10 of the present invention, without a stand alone magnet, and with magnetic particles interspersed throughout the entirety of float 10, avoids the disadvantages of the prior art.

Additionally, float 10 as shown, having thin sidewalls in the regions of 30, 40 and 42, utilizes a small amount of float material to manufacture float 10, and so float 10 as shown, if manufactured without the foaming agent of the present invention, may not provide enough buoyancy to support a stand-alone magnet on the float 10.

Increasing a thickness of regions 30, 40 and 42 of float 10 may not be feasible, however, because it may be desirable to manufacture float 10 with a small footprint or profile 15, (wherein the footprint or profile 15 of float 10 may be defined by the size and shape of the perimeter of end surface 14 and/or 16), so that the level sending unit, together with the float, may occupy a small amount of space within a fuel tank, and may occupy a small profile or footprint 15, to ensure that movement of the float is not hindered by another device or apparatus within the fuel tank. Moreover, providing a level sending unit 34 (FIG. 4) with a small profile or footprint, such as by providing such an apparatus with a float 10 having a small profile or footprint 15, may allow the fuel sending unit 34 to be placed into a fuel tank 46 (FIG. 5) through an aperture 44 (FIG. 5) in a side wall of a fuel tank that is smaller than an aperture that may be required by prior art fuel sending units.

Due to the unique shape of interior aperture 18 of float 10, when the float 10 is positioned around a rod 20 (FIG. 9) having a outer shape the corresponds to the shape of aperture 18, the float 10 will not rotate about the rod 20 but instead will slide upwardly and downwardly along the rod (FIG. 9), as will be discussed in more detail below. Accordingly, in the embodiment shown, region 30 of float 10 will remain positioned adjacent a printed circuit board 48 (FIG. 9) positioned within interior aperture 18 of float 10, and float 10 will move upwardly and downwardly along the printed circuit board without rotating about rod 20. Accordingly, it is desirable that region 30 of float 10 has a magnetic property so as to activate ones of the multiple sensors or switches of the printed circuit board positioned within rod 20 adjacent to the sliding path of region 30 of float 10.

FIG. 2 is a front view of the float 10 of FIG. 1 showing cylindrical side wall 12, upper surface 14, and aperture 18 with regions 30, 40 and 42, having corresponding thicknesses 32, 36 and 38. Inwardly extending regions 50, 52 and 54, also known as anti-rotation regions, ensure that float 10 will not rotate about a rod 20 (FIG. 5) when the rod has an exterior shape that corresponds to the interior shape of aperture 18.

FIG. 3 is a plan view of the float 10 of FIG. 1 showing cylindrical sidewall 12 with no protrusions or discontinuities. Accordingly, the smooth exterior surface of cylindrical sidewall 12 of float 10 allows the float to side upwardly and downwardly along rod 20 (FIG. 4) without hindrance.

FIG. 4 is an isometric view of one example embodiment of a fuel sending unit, or level sending unit 34, of the present invention, with a float 10 in a lowered position on rod 20.

FIG. 5 is a side view of fuel tank assembly 56 including fuel sending unit 34 mounted within aperture 44 of fuel tank 46 with float 10 in a lowered position on rod 20 of fuel sending unit 34, level with a low fuel level 62 in fuel tank 46.

FIG. 6 is a side view of fuel tank assembly 56 including fuel sending unit 34 mounted within aperture 44 of fuel tank 46 with float 10 in a raised position on rod 20 of fuel sending unit 34, level with a high fuel level 64 in fuel tank 46.

FIG. 7 is a plan view of one example embodiment of a printed circuit board (PCB) 48 of a fuel sending unit 34, wherein PCB 48, also referred to as a sensor board, includes a plurality of sensors, such as reed switches, 66 positioned along a length 68 of PCB 48. PCB 48 includes first and second wires 70 and 72 extending there from so that the PCB can be electrically connected to a fuel gauge display 74 (shown schematically) in the cab of an automobile, for example. In the embodiment shown, PCB includes 24 switches 66 spaced substantially evenly along length 68 of PCB 48, such that as sequentially arranged switches 66 are activated by magnetized float 10 (FIG. 6), as float 10 travels downwardly along rod 20 in a downward direction 76 (FIG. 6), fuel gauge display 74 will indicate a lowering fuel level 62 of fuel within tank 46. Similarly, as fuel is filled into fuel tank 46, float 10 will rise upwardly along rod 20 in an upward direction 78 (FIG. 6), and fuel gauge display 74 will indicate a raising fuel level 64 of fuel 62 within tank 46. In other embodiments, other lengths of PCB 48 having different numbers of switches 66 may be utilized, as may be desired for different sized fuel tanks.

Figure 8:
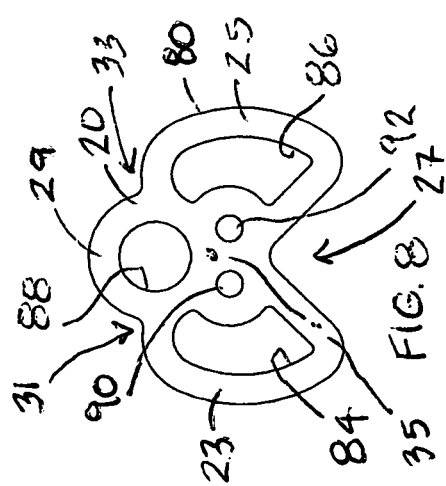
FIG. 8 is a plan view of one example embodiment of a tube including a fuel sending unit receiving aperture.

FIG. 8 is a plan view of one example embodiment of a rod, or tube, 20. Tube 20, in the embodiment shown, includes an exterior cross sectional shape, or footprint, 80 that may be described as a "butterfly" shape, that generally corresponds to or mates with the shape of aperture 18 of float 10 (FIG. 1). In other words, the exterior shape 80 of rod 20 corresponds to the interior shape of aperture 18 of float 10 (FIG. 1), and generally is slightly smaller in size than aperture 18 so that, in the embodiment shown, there may be a clearance 82 (FIG. 9) of approximately 0.063 inches. Rod 20 may be extruded and thereafter cut to length as desired. Rod 20 may be manufactured of aluminum or any other material as may be desired for a particular application.

In the embodiment shown, side lobe 23 of rod 20 may include a draw aperture 84 and side lobe 25 of rod 20 may include a return aperture 86, wherein draw and return apertures 84 and 86 draw and return fuel, correspondingly, from draw and return fuel lines connected to an engine on a vehicle on which fuel tank 46 (FIG. 5) is mounted. A central lobe 29 of rod 20 may include a level sender unit aperture 88 in which PCB 48 (FIG. 7) may be mounted. Rod 20 may further include an auxiliary aperture 90 and a fastener aperture 92 for securing rod 20 to a fuel sending unit cap. Rod 20 may also include a first indented region 27 between first and second lobes 23 and 25, a second indented region 31 between first lobe 23 and central lobe 29, and a third indented region 33 between second lobe 25 and central lobe 29, wherein each of the indented regions 27, 31 and 33 may each individually or collectively function as a rotational stop that prevents or hinders float 10 (FIG. 1) from rotating about an elongate axis 35 of rod 20.

Figure 9:
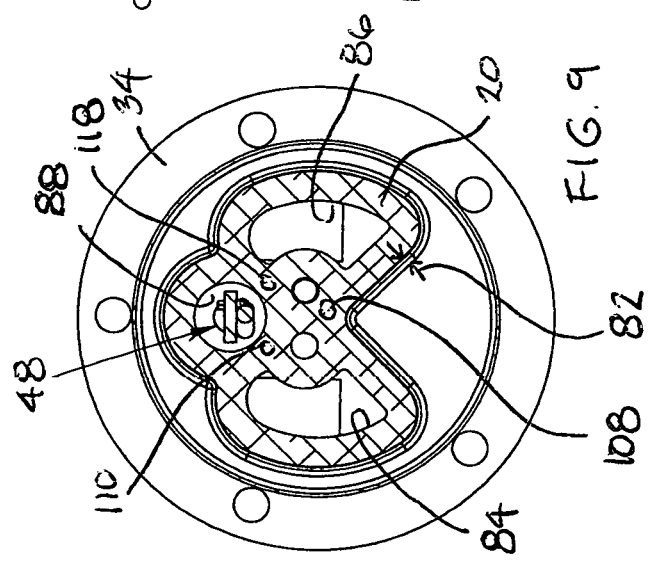
FIG. 9 is a cross sectional top view of one example embodiment of a fuel sending unit including a printed circuit board positioned inside a fuel sending unit receiving aperture.

FIG. 9 is a cross sectional top view of one example embodiment of a fuel sending unit 34 including a printed circuit board 48 positioned inside a fuel sending unit receiving aperture 88 of rod 20.

Figure 10:
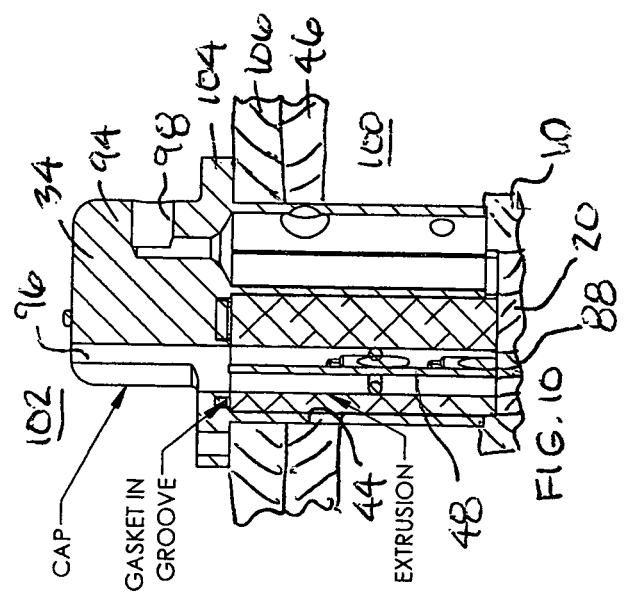
FIG. 10 is a side cross sectional view of one example embodiment of a fuel sending unit including a tube having a printed circuit board positioned inside a fuel sending unit receiving aperture of the tube, and a float positioned around the tube.

FIG. 10 is a side cross sectional view of one example embodiment of a fuel sending unit 34 including rod 20 secured to a cap 94. Cap 94 includes an aperture 96 that communicates with level sending unit aperture 88 in rod 20 so that PCB 48 may extend through both cap aperture 96 and level sending unit aperture 88. Cap 94 may include a vent aperture 98 so as to allow fluid and/or air communication between an interior 100 of fuel tank 46 and an exterior 102 of fuel tank 46. Cap 94 may further include a shoulder 104 that may be secured directly to fuel tank 46 or may be secured to a flange 106 which is secured to fuel tank 46 at aperture 44 of the fuel tank. Float 10 may be positioned around rod 20 and, in a raised position as shown, may be positioned adjacent cap 94 of the level sending unit 34.

Referring again to FIG. 1, in one embodiment float 10 may be manufactured as a magnetic infused plastic that is processed in an injection molding process with a foaming agent added during formation thereof. The foaming agent may activate and/or produce carbon dioxide inside the float material as it is being produced into the final float product shape in the injection mold. As the part is removed from the mold, the carbon dioxide is infused into the plastic creating air voids and thus reduces the material density enough so that the part will float. The finished float, therefore, will have a buoyancy that will allow the produced float to float on a liquid such as liquefied automobile fuel, and will also provide a magnetized float having magnetized particles interspersed throughout the final float product. Details of the process of manufacturing the float will now be described.

The magnetic material 108 may be interspersed with a substrate material 110, such as plastic, to produce float 10 having magnetized particles interspersed throughout the finished float product. In one embodiment, the magnetized material 108 added to the production mix may be "NdFeB Compound-IM 5", having the following magnetic characteristics: residual induction Br of 4.72 kGs, a coercive Force Hc of 4.21 kOe, an Intrinsic Coercivity Hcj of 10.05 kOe, and an Energy Product (BH)m of 5.00 MGOe. The Density of the magnetic NdFeB Compound-IM 5 may be 4.8 plus or minus 0.40 g/cm^3, and may be an odorless, dark-gray granule 3-5 millimeters (mm) in size, prior to forming of float 10, having a melting point of 180 plus or minus 5 degrees Celsius, for feeding into a mold prior to processing. The NdFeB Compound-IM 5 may include a composition by weight concentration of: Neodymium 13.5 to 18%; Praseodymium 2.7 to 6.3%; Lanthanum 0 to 1.8%; Cerium 0 to 1.8%; Boron 0.63 to 1.53%; Zirconium 0.9 to 4.5%; Iron 58.5 to 67.5%; and Polyamide-12 of 8 to 12%. In the finished float product 10, the float will have metallic particles 108 interspersed throughout the float that have a size of approximately 3-5 millimeters (mm) in size.

The foaming agent 112 that may be added to magnetic material 108 and plastic material 110 during processing may be any suitable foaming agent, and in one embodiment is CEL-SPAN 844 ®, a highly loaded 80% active endothermic foaming agent formulated for applications with high gas requirements. The CEL-SPAN 844 ® foaming agent 112, prior to processing, may be a dust free white pellet having a decomposition temperature of 165 degrees Fahrenheit to 300 degrees Fahrenheit, a gas volume of 120 to 130 cc/gm, and which will evolve carbon dioxide ($CO_2$) upon decomposition, such as during an extruding processing.

Figure 11:
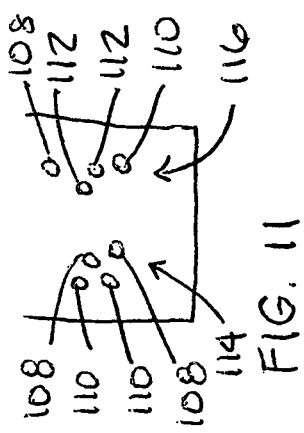
FIG. 11 shows a schematic diagram of one embodiment of the manufacturing process for manufacturing the float of the present invention.

FIG. 11 shows a schematic diagram of one embodiment of the manufacturing process. In one embodiment, plastic pellets 110 and magnetic material pellets 108 are mixed together for the float forming process to form a first mix or blend 114. The first mix 114 of plastic pellets 110 and magnetic material 108 may be in a range of 30 to 50% by volume of magnetic material 108 and 50 to 70% by volume plastic pellets 110. This first mix 114 of magnetic and plastic materials is then mixed together with foaming agent 112 in a range of 5 to 10% by volume of foaming agent 112 and 90 to 95% by volume of first mix 114 to form a second blend or second mix 116. This second mix 116 of magnetic material pellets 108, plastic pellets 110 and foaming agent 112 is then mixed thoroughly to evenly mix the three components, and is then processed such as by extrusion, injection or rotational molding, or any other float forming process as may be desired, to form the finished float product, float 10 (FIG. 1). This process results in a float 10 having air voids 118 positioned within and interspersed throughout the float 10, and magnetized particulars 108 scattered or interspersed throughout the float 10, including the interior of the float as shown in the cross sectional view of FIG. 9, such that the float 10 is buoyant and magnetized throughout the float 10. Such a buoyant, magnetized float 10 allows the float to be manufactured with thin walls, in custom shapes, and in sizes that heretofore have not been possible in floats of the prior art. In particular, the buoyant, magnetized float 10 of the present invention may be formed with thin walls because the walls need not support a heavy, stand-alone magnet secured thereon. The buoyant, magnetized float 10 of the present invention may be formed with custom shapes so that the float may be designed to have a small footprint, or a shape that allows the float to be positioned in out of the way locations not heretofore possible with prior art floats. The buoyant, magnetized float 10 of the present invention may be formed in a small size because the float does not need to be manufactured in a size sufficient to support a heavy, stand-alone magnet. Such a float 10 having a foaming agent 112 (which produces air voids 118 interspersed throughout the float 10), plastic material 110, and magnetized particles 108 interspersed throughout the float, has heretofore not be contemplated by the prior art.

In the finished float product 10, the float will have metallic particles 108 interspersed throughout the float that have a size of approximately 3-5 millimeters (mm) in size. In the finished float product 10, the float will have air pockets 118 interspersed throughout the float that have a size in a range of approximately 0.001 to 0.10 inches in size. The finished float product 10 will have plastic material 110 that is fused together to form the substrate of the float the binds the magnetic particles 108 and the air voids 118 in place.

In the above description numerous details have been set forth in order to provide a more through understanding of the present invention. It will be obvious, however, to one skilled in the art that the present invention may be practiced using other equivalent designs.

I claim:

1. A fuel tank assembly, comprising:
   a fuel tank including a wall having a tank aperture extending there through; and
   a fuel tank assembly secured within said tank aperture of said fuel tank;
   wherein said fuel tank assembly includes a fuel sending unit having a float manufactured of a plastic material, said plastic material including a plurality of magnetized particles interspersed and scattered throughout said plastic material and a foaming agent interspersed throughout said float such that said float includes a plurality of voids interspersed and scattered throughout said plastic material.

2. The assembly of claim 1 wherein said plastic material includes said foaming agent, including said voids, in a range of 5 to 10% by volume, and a mix of said plastic material and said magnetized particles in a range of 90 to 95% by volume.

3. The assembly of claim 2 wherein said mix includes said magnetized particles in a range of 30 to 50% by volume, and said plastic material in a range of 50 to 70% by volume.

4. The assembly of claim 1 wherein said magnetized particles have a size of at most 5 millimeters and wherein said voids have a size of at most 0.10 inches.

5. The assembly of claim 1 wherein said plastic material, including said plurality of magnetized particles and said plurality of voids scattered throughout said plastic material, defines a cylindrical exterior shape of said float and a float aperture that extends there through.

6. The assembly of claim 5 wherein said fuel sending unit includes a rod extending through said float aperture and a printed circuit board positioned within said rod and having a plurality of switches activated by said magnetized particles of said float as said float moves along said rod and adjacent individual ones of said plurality of switches.

7. The assembly of claim 5 wherein said float aperture includes an anti-rotation region, and wherein said fuel sending unit includes a rod that defines an exterior shape that mates with a shape of said float aperture.

8. The assembly of claim 1 wherein said magnetized particles include Neodymium, Iron and Boron.

9. A level sending unit assembly, comprising:
   a level sending unit cap;
   a level sending unit rod secured to said cap;
   a level sending unit printed circuit board positioned within an elongate void in said rod, said printed circuit board including a plurality of switches positioned there along; and
   a float positioned around said rod, said float including magnetized particles interspersed and scattered throughout said float and air voids interspersed throughout said float, said magnetized particles present in a number sufficient to activate individual ones of said switches positioned on said printed circuit board as said float moves along said rod and adjacent to said individual ones of said switches, and said air voids present in a number sufficient to render said float buoyant in a liquid automobile fuel.

10. The assembly of claim 9 wherein said float is manufactured from a blend that includes a foaming agent and a mix of plastic pellets and said magnetized particles, said foaming agent forming said air voids, said blend including said foaming agent in a range of 5 to 10% by volume, and said mix of plastic pellets and magnetized particles in a range of 90 to 95% by volume.

11. The assembly of claim 10 wherein said mix includes said magnetized particles in a range of 30 to 50% by volume, and said plastic pellets in a range of 50 to 70% by volume.

12. The assembly of claim 9 wherein said magnetized particles have a size in a range of 3 to 5 mm, and said air voids have a size in a range of 0.001 to 0.10 inches.

13. The assembly of claim 9 wherein said rod defines first and second side lobes having an indented region there between, and wherein said float includes an aperture that defines first and second lobes and an inwardly extending region there between, wherein said inwardly extending region of said float is received within said indented region of said rod so as to hinder rotation of said float about an elongate axis of said rod.

14. A fuel tank level sending unit assembly, comprising:
   a sensor board including a plurality of magnetically activated switches positioned along a length of said sensor board; and
   a float including magnetized particles interspersed and scattered throughout said float and air voids interspersed throughout said float, said magnetized particles present in a number sufficient to activate individual ones of said switches positioned on said sensor board as said float moves along said length of said board and adjacent to said individual ones of said switches, and said air voids present in a number sufficient to render said float buoyant in a liquid automobile fuel.

15. The assembly of claim 14 wherein said float is manufactured from a blend that includes a foaming agent and a mix of plastic and magnetized particles, said foaming agent forming said air voids, said blend including said foaming agent in a range of 5 to 10% by volume, and said mix of plastic and magnetized particles in a range of 90 to 95% by volume.

16. The assembly of claim 15 wherein said mix includes said magnetized particles in a range of 30 to 50% by volume, and said plastic in a range of 50 to 70% by volume.

17. The assembly of claim 14 wherein said float includes said magnetized particles having a size in a range of 3 to 5 mm, and air voids having a size in a range of 0.001 to 0.10 inches.

18. The assembly of claim 17 further including a rod having said sensor board positioned therein, wherein said rod defines first and second side lobes having an indented region there between, and wherein said float includes an aperture that defines first and second lobes and an inwardly extending region there between, wherein said float is positioned around said rod such that said inwardly extending region of said float is received within said indented region of said rod so as to hinder rotation of said float about an elongate axis of said rod.

19. The assembly of claim 14 wherein said magnetized particles include Neodymium, Iron and Boron.

20. The assembly of claim 18 further comprising a level sending unit cap having a fastener aperture extending there through, said rod including a fastener aperture in an end region thereof, and said assembly further including a fastener extending through said cap fastener aperture and said rod fastener aperture to secure said rod to said cap.

* * * * *